(12) United States Patent
Welch et al.

(10) Patent No.: US 8,557,059 B2
(45) Date of Patent: Oct. 15, 2013

(54) PLASTIC INJECTION MOLD OF LOW CARBON MARTENSITIC STAINLESS STEEL

(75) Inventors: Kristopher D Welch, Anaheim, CA (US); Robert J. Friedrich, Bear, DE (US); Eric D. Henn, Newport Beach, CA (US); Michael A. Guscott, Santa Ana, CA (US)

(73) Assignee: Edro Specialty Steels, Inc., Walnut, CA (US)

( * ) Notice: Subject to any disclaimer, the term of this patent is extended or adjusted under 35 U.S.C. 154(b) by 96 days.

(21) Appl. No.: 12/478,985

(22) Filed: Jun. 5, 2009

(65) Prior Publication Data

US 2010/0308505 A1    Dec. 9, 2010

(51) Int. Cl.
*B29C 33/40* (2006.01)
(52) U.S. Cl.
USPC .......................................... 148/325; 264/337
(58) Field of Classification Search
USPC ............... 425/542; 420/8; 148/325, 326, 542; 264/337
See application file for complete search history.

(56) References Cited

U.S. PATENT DOCUMENTS

| | | | |
|---|---|---|---|
| 3,154,412 A | 10/1964 | Kasak et al. |
| 3,595,643 A | 7/1971 | Boyce et al. |
| 3,767,390 A | 10/1973 | Hahn |
| 3,933,480 A | 1/1976 | Tipnis |
| 4,594,115 A | 6/1986 | Lacoude et al. |
| 4,652,428 A | 3/1987 | Maruhashi et al. |
| 4,769,213 A | 9/1988 | Haswell, Jr. et al. |
| 4,793,953 A | 12/1988 | Maus |
| 4,798,634 A | 1/1989 | McCune, III et al. |
| 5,089,067 A | 2/1992 | Schumacher |
| 5,110,544 A | 5/1992 | Sato et al. |
| 5,362,337 A | 11/1994 | Kosa |
| 5,364,588 A | 11/1994 | Finkl et al. |
| 5,370,750 A | 12/1994 | Novotny et al. |
| 5,397,379 A | 3/1995 | Barker et al. |
| 5,447,800 A | 9/1995 | Dorsch et al. |
| 5,496,421 A | 3/1996 | Hashizume et al. |
| 5,512,237 A | 4/1996 | Stigenberg |
| 5,902,374 A | 5/1999 | Kitamura et al. |
| 5,906,841 A | 5/1999 | Bak |

(Continued)

FOREIGN PATENT DOCUMENTS

| EP | 0870849 B1 | 12/2001 |
|---|---|---|
| EP | 1238118 B1 | 9/2005 |

(Continued)

OTHER PUBLICATIONS

International Search Report and Written Opinion mailed Jan. 18, 2011 for PCT/US2010/001628.

*Primary Examiner* — Larry Thrower
(74) *Attorney, Agent, or Firm* — Buchanan Ingersoll & Rooney PC

(57) ABSTRACT

A mold plate having a mold cavity configured for plastic injection molding one or more articles such as a panel or frame of an electronic display screen such as a flat screen TV is formed from a low carbon martensitic stainless steel alloy comprising: about 0.05%-0.07% by weight C, about 1.15%-1.45% by weight Mn, a maximum of 0.025% by weight P, a maximum of 0.008% by weight S, about 0.3%-0.6% by weight Si, about 12.15%-12.65% by weight Cr, about 0%-0.5% by weight Ni, about 0.45%-0.65% by weight Cu, about 0.02%-0.08% by weight V, about 0.04%-0.08% by weight N, with the balance being Fe with trace amounts of ordinarily present elements.

22 Claims, 1 Drawing Sheet

(56) References Cited

U.S. PATENT DOCUMENTS

| | | | |
|---|---|---|---|
| 6,045,633 A | 4/2000 | Henn et al. | |
| 6,146,475 A | 11/2000 | Kosa | |
| 6,181,509 B1 | 1/2001 | Canlas et al. | |
| 6,358,334 B2 | 3/2002 | Henn et al. | |
| 6,723,181 B2 | 4/2004 | Ishikawa et al. | |
| 6,770,243 B2 | 8/2004 | Kloss-Ulitzka et al. | |
| 6,776,931 B2 | 8/2004 | Nishigaki | |
| 6,893,608 B2 | 5/2005 | Sammt et al. | |
| 2002/0162614 A1* | 11/2002 | Sammt et al. | 148/609 |
| 2003/0132545 A1 | 7/2003 | Shepheard | |
| 2005/0079087 A1 | 4/2005 | Henn et al. | |
| 2006/0073235 A1 | 4/2006 | Ringer, Sr. | |
| 2006/0284345 A1 | 12/2006 | Sudo et al. | |
| 2008/0069719 A1 | 3/2008 | Beguinot et al. | |
| 2008/0073006 A1* | 3/2008 | Henn et al. | 148/654 |

FOREIGN PATENT DOCUMENTS

| | | |
|---|---|---|
| JP | 04-002745 | 1/1992 |
| JP | 06-010042 | 1/1994 |
| JP | 11-198148 | 7/1999 |

* cited by examiner

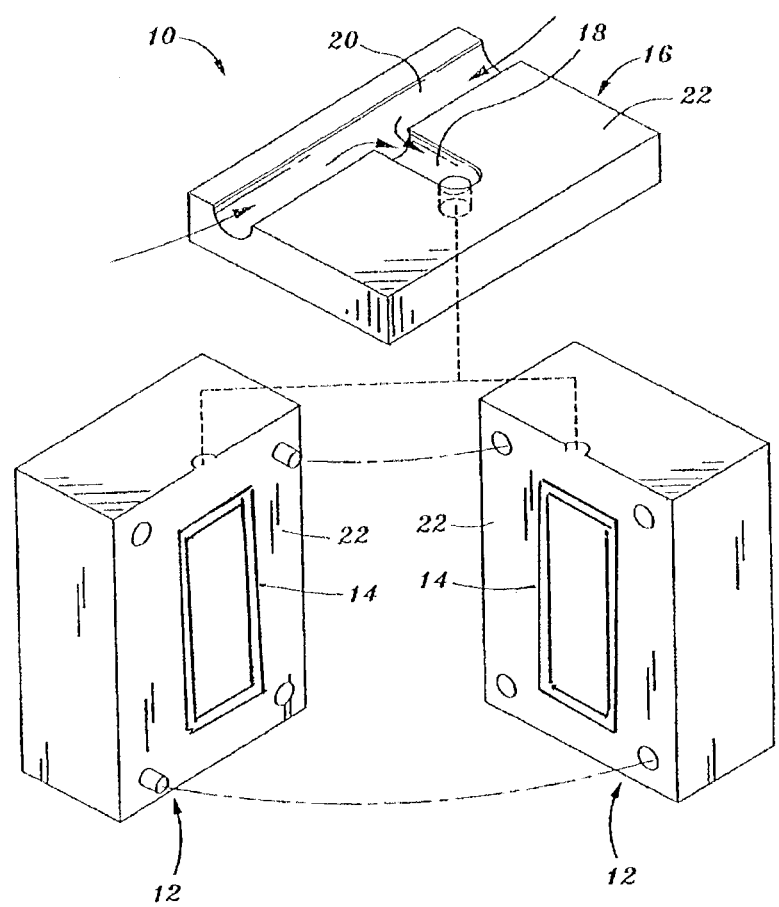

PLASTIC INJECTION MOLD OF LOW CARBON MARTENSITIC STAINLESS STEEL

FIELD OF THE INVENTION

This invention relates to low carbon martensitic stainless steel used for a plastic injection mold, method of its manufacture and method of using the mold.

BACKGROUND

A mold used for plastic injection can comprise a group of steel plates which align to create a molding surface. Such plates are machined out of a six sided plate with precise dimensions and surface finish.

SUMMARY

Disclosed herein is a mold for plastic injection comprising mold plates which have a highly polished mold surface shaped for panels and frames of electronic display screens such as flat screen televisions, computer monitors, laptops and the like or other applications requiring a highly polished mold surface. The mold is formed from a low carbon martensitic stainless steel alloy comprising in weight %: about 0.05 to 0.07% C; about 1.15 to 1.45% Mn; about 0 to 0.025% P; about 0 to 0.008% S; about 0.3 to 0.6% Si; about 12.15 to 12.65% Cr; about 0 to 0.5% Ni; about 0.45 to 0.65% Cu; about 0.02 to 0.08% V; about 0.04 to 0.08% N; the balance being Fe with trace amounts of impurities.

Also disclosed herein is a process of manufacturing a mold for plastic injection molds. The process comprises the steps of: casting a steel alloy comprising about 1.15%-1.45% by weight Mn, a maximum of 0.025% by weight P, about 0.3%-0.6% by weight Si, about 12.15%-12.65% by weight Cr, a maximum of 0.5% by weight Ni, about 0.45%-0.65% by weight Cu, about 0.02%-0.08% by weight V, about 0.04%-0.08% by weight N, a maximum of 0.008% by weight S, about 0.05% to 0.07% by weight C and the balance being Fe with residual impurities, at a temperature not lower than 2800° F.; hot working the steel alloy within the temperature range of about 1700-2250° F.; hot leveling and cooling the steel alloy by free air cooling to room temperature with or without heat treating so as to provide a plate having a hardness of about 38 to 42 HRC; machining a mold cavity in the plate; and polishing the mold surface to a mirror finish. The mold surface can be used to mold articles such as a panel or frame of an electronic display such as a flat screen television, computer monitor, laptop or the like; or other articles in which a highly polished surface finish is desired.

BRIEF DESCRIPTION OF THE DRAWING FIGURES

FIG. 1 illustrates plastic injection tooling including a pair of mold plates.

DETAILED DESCRIPTION

In plastic injection molding, a mold is used to allow mass production of plastic injection molded articles. The mold is typically a group of 2 or more mold plates. Manufacture of mold plates involves machining a six sided plate having parallel major surfaces, parallel top and bottom sides and parallel left and right sides. In order to minimize waste of material, it is desirable to make the mold plates from plate material requiring the least amount of machining of the six sides. It is also desirable to make the mold plates from material that exhibits good polishability and maintains dimensional stability after heavy machining.

A plastic injection mold 10 having a pair of mold plates defining a mold cavity 14 and manifold 16 is shown in FIG. 1. The manifold 16 may include sprues 18 or runners 20 such that the manifold 16 may be used in plastic injection mold 10. The mold plate is of a low carbon martensitic stainless steel. While a rectangular mold cavity is shown, the mold plate can have one or more mold cavities of any desired shape.

In a preferred embodiment, the stainless steel is intended for manufacture of plastic injection molds for producing panels and frames of electronic display screens such as flat screen televisions (TVs) such as LCD and plasma TVs, computer monitors, laptops and the like. The mold sizes needed for such panels can range up to 200 mm in thickness and up to 1.5 m and larger in width. The stainless steel described herein can be used to form a mold surface having a cavity shaped to mold one or more articles such as a panel or frame of a flat screen TV.

The stainless steel preferably has a composition which provides various properties such as hardness, ductility, surface quality (i.e., good polishability and consistent surface finish), machinability, corrosion resistance, high level of dimensional stability, hot workability, and/or age hardenability as described below.

In an embodiment, a mold plate for plastic injection molding of articles such as panels and frames of electronic display screens is made from a low carbon stainless steel alloy which can be cast and subject to working to plate shapes having a martensitic microstructure with less than 10% ferrite phase and chemical composition as shown in Table I. The alloy is preferably electric furnace melted and further processed by AOD (argon oxygen decarburization), VOD or other processing suitable for producing low carbon stainless steels. The composition of the alloy is preferably adjusted to provide a low-sulfur content with the composition range is given below in Table I wherein all values are in weight %.

TABLE 1

| | element | | | | | | | | | |
|---|---|---|---|---|---|---|---|---|---|---|
| | C | Mn | P | S | Si | Cr | Ni | Cu | V | N |
| minimum | 0.050 | 1.15 | N/A | N/A | 0.30 | 12.15 | N/A | 0.45 | 0.02 | 0.04 |
| maximum | 0.07 | 1.45 | 0.025 | 0.008 | 0.60 | 12.65 | 0.50 | 0.65 | 0.08 | 0.08 |
| aim | 0.06 | 1.30 | LAP | LAP | 0.45 | 12.40 | LAP | 0.55 | 0.05 | 0.06 |

In Table I, "N/A" means that there is none added and "LAP" means as low as possible. However, various additional elements can be present in the alloy as set forth in Table 2 wherein all values are in weight %.

TABLE 2

| | element | | | | | | | |
|---|---|---|---|---|---|---|---|---|
| | Mo | Cb | Ti | Co | Al | Sn | O | W |
| maximum | 0.25 | 0.05 | 0.05 | 0.20 | 0.05 | 0.03 | LAP | 0.15 |

The balance of the alloy is 80% by weight or more Fe and those impurities and tramp elements which are inevitably included during the melting of the material. The function of each of the intentionally included elements in the analysis are as follows:

Carbon-0.07% Maximum

Carbon combines with chromium to precipitate as a carbide, depleting the effective level of chromium which negatively affects corrosion resistance. Carbon level dramatically controls hardness attainable. Maintaining the carbon level of the grade as low as possible while still achieving the designed hardness levels promotes improved corrosion resistance with addition of a minimum of chromium. Carbon content of 0.07% or less provides adequate hardenability without degrading the corrosion properties of the grade and so is thus specified. A preferred carbon content is about 0.06%.

Manganese: 1.15 to 1.45%

Manganese acts as a strengthening agent, a de-oxidizer and also, as an austenite stabilizer to prevent the formation of ferrite. The upper limit of 1.45% manganese is specified to control the embrittling effects of excess manganese. The specified range of 1.15 to 1.45% manganese produces all the desired effects without any negative impact on the grade's properties.

Phosphorus: 0.025% Maximum

Although phosphorous adds to the hardenability of steels, phosphorus is intentionally not added. However, phosphorous may be tolerated in amounts up to 0.025%.

Sulfur: 0.008% Maximum

While sulfur is the most widely used additive to steel to promote improved machinability, sulfur is minimized in the alloy to improve surface properties of the steel to thereby provide a desired surface finish of injection molded plastic parts made by the mold surface. Preferably, the sulfur is low enough to avoid detectable sulfides by ASTM E 45-05, Method A.

Chromium: 12.15 to 12.65%

Chromium acts to enhance hardenability, making possible a material which will readily transform to the desired martensitic structure in heavy cross sections with air cooling. Chromium content of 12.15% minimum is provided to give desired corrosion resistance in the grade. Increasing levels of chromium promote the formation of the undesirable ferrite phase, particularly in this grade with low carbon content. The chromium is therefore controlled to the range of 12.15% minimum to 12.65% maximum.

Silicon: 0.3 to 0.6%

Silicon acts as the primary de-oxidizer in the molten metal and is therefore necessary. Increasing levels of silicon however promote ferrite and undesirable slag inclusions. Adequate de-oxidizing action occurs with silicon present in the range of 0.3% minimum to 0.6% maximum and silicon is therefore limited to this content in the alloy.

Copper: 0.45 to 0.65%

Copper can be fully dissolved in the base metal matrix as a solid solution. The presence of copper improves the corrosion resistance and conductivity. Additionally, the copper allows the alloy to respond to a low temperature aging process which can be used to elevate the strength level of the material either prior to machining or after, with no apparent distortion or cracking problems. Lower levels of copper than specified diminish the desired effect and higher levels of copper can promote hot working problems. The range of 0.45 to 0.65% has been found to produce desired results with no detrimental effects and so is thus specified.

Nitrogen: 0.04 to 0.08%

Nitrogen contributes to the corrosion resistance of the material and also acts to stabilize the austenite phase, improving hardenability and diminishing the occurrence of ferrite formation. Nitrogen tends to form chromium rich nitride particles during aging and tempering. These particles reduce the effectiveness of the chromium from the standpoint of corrosion resistance. Therefore, the amount of nitrogen added is kept moderate within the 0.04 to 0.08% range specified.

Vanadium: 0.02 to 0.08%

Vanadium forms a stable carbide precipitate which is very effective in controlling grain growth, necessary to produce material without grain coarsening which would promote unacceptable low ductility. Due to its tendency to increase the formation of the ferrite phase and in light of the low carbon levels in the material, vanadium level is adequate and useful at the specified range of 0.02 to 0.08%.

Hardness

The stainless steel alloy can be cast, hot worked, air cooled and age hardened to provide a prehardened stainless steel having a Rockwell C hardness in the range of about 38 to 42 HRC. Compared to steels which must be heat treated by quench and tempering to increase hardness with consequent loss in ductility, toughness, flatness and machinability, the prehardened stainless steel can be provided in an air-cooled and age hardened condition after hot working with a desired hardness and thus avoid the need for additional processing steps such as normalizing, quenching, tempering heat treatment and flattening.

Surface Finish

It is desirable to reduce or eliminate sulfur in the steel to improve the surface finish of the mold surface used to shape articles such as injection molded panels or frames of electronic displays screens such as flat screen TVs. For mold surfaces used for such panels and frames, it is desirable to injection mold the panels or frames with a black or silver color and high glossy finish. To achieve such finish, the mold surface must be polished to a mirror finish. As such, minimizing formation of sulfides, oxide stringers, silicates and globular oxides is desirable.

The nonmetallic inclusion content of steels is commonly measured by standardized method ASTM E 45-05, Method A which uses the average of 50 fields of view. However, in order to provide desired polishability in every heat of the steel which is to be processed into mold parts having highly polished surfaces, the nonmetallic inclusion content is carefully controlled to meet the following limits in Table 3 following the rating system in ASTM E 45-05, Method A.

TABLE 3

| Inclusion Type | sulphides | string oxides | silicates | globular oxides |
|---|---|---|---|---|
| Thin | 1.5 | 2.0 | 1.0 | 1.5 |
| Heavy | 1.0 | 1.0 | 1.0 | 1.0 |

The inclusion sizes listed in Table 3 are the maximum which can be tolerated for any one sample from any plate of steel tested. Any one large slag inclusion is particularly detrimental as it may result in a visible pit mark on a highly polished mold surface.

In a preferred embodiment, the steel is processed to attain inclusion sizes with the maximum values listed in Table 4.

TABLE 4

| Inclusion Type | sulphides | string oxides | silicates | globular oxides |
| --- | --- | --- | --- | --- |
| Thin | 1.0 | 1.0 | 1.0 | 1.0 |
| Heavy | 1.0 | 1.0 | 1.0 | 1.0 |

Details of Manufacturing

A mold plate may be formed from the steel alloy in a process that is initiated with preparation of a material charge. The material charge may be prepared using the elements listed above and in the ranges specified for the chemical composition. The material charge may include additional amounts of certain elements to account for estimated melt losses as a result of oxidation during the production of the alloy steel.

Following its preparation, the material charge is preferably introduced into an electric furnace such as a conventional electric furnace of the type used in manufacturing ferrous and non-ferrous metals. Melting of the material charge may be achieved by supplying energy to a furnace interior. Electrical energy may be supplied to the furnace interior via graphite electrodes. Following melting of the material charge, the melted material may be refined by ladle refining. Such ladle refining acts to remove impurities and homogenize the melted material. In addition, ladle refining allows for relatively tight control over the chemical and mechanical properties of the final product through improved accuracy in the composition of the final product. In addition, ladle refining allows for relatively high levels of cleanliness due to control over inclusion morphology. Remelting such as by electroslag remelting (ESR), vacuum arc remelting (VAR) or the like can also be used to attain desired cleanliness and polishability.

During the ladle refining process, ladles are used to transfer melted or molten material from the electric furnace to a refining or pouring station. Ladle refining involves using ladles with a heating source to heat the melted material that is tapped from the electric furnace to a precise temperature. The ladle refining step provides an opportunity to refine the composition of the steel alloy to a desired chemical composition such that the elements are present in the ranges given above.

During the ladle refining step, chemicals may be added to the melted material in order to remove impurities. If desired, alloy elements may be added in order to enhance the mechanical properties of the steel alloy. In addition, the ladle refining may include a stirring action that may aid in homogenizing the temperature and composition of the melted material to achieve uniform characteristics or properties of the material Slag may additionally be removed from the melted material in the ladle refining process.

The melted material is preferably vacuum degassed in order to remove gases. During vacuum degassing, the melted material is disposed within a degasser vacuum chamber where it is subjected to a vacuum in order to reduce or remove residual levels of carbon monoxide, carbon dioxide as well as nitrogen gas in the melted material. In addition, vacuum degassing causes hydrogen to diffuse and separate from the melted material so as to prevent hydrogen-induced defects in the finished steel alloy. Oxygen, hydrogen and nitrogen containing gases are vented from the vacuum degasser as the steel is continuously circulated through the degasser vacuum chamber so as to improve the mechanical properties of the steel alloy.

Following vacuum degassing the melted material can be continuous cast or bottom poured into molds using an argon gas shield to form solid ingots (e.g., 5-16 metric ton ingots). During the pouring of the melted material, argon gases are used to shield the melted material from air contamination and create a non-oxidizing environment in which the melted material may be poured into the molds. Continuous casting is an economical process especially useful for lighter gauge plate such as 4 inch thick and thinner plate. The cast slabs or ingots are later reheated for hot working into a desired shape. Hot rolling and/or forging can be carried out at initial temperatures of 1700 to 2250° F. and finishing temperatures of 1560 to 1700° F. For example, the ingots can be hot rolled to plate of desired thickness and width on a Quatro (4 high) rolling mill and the material may be hot rolled to 90 mm or 120 mm gauges at 1525 mm widths. The 90 mm gauge plate can be hot rolled using a rolling reduction of 5:1 and the 120 mm gauge plate can be hot rolled using a 4:1 rolling reduction in a plate configuration from which the mold plate may ultimately be fabricated.

The plate is preferably hot leveled immediately after working in order to flatten the plate while still hot. The plate is preferably hot leveled while still on the hot rolling mill or hot forging mill. The hot worked plate is preferably maintained above 1500° F. when the hot leveling is performed. The excellent flatness of the material that results from the hot leveling minimizes the amount of material that must be removed from surfaces in order to produce flat and parallel machined surfaces. For example, the hot rolled plate can be leveled on a 4 over 5 leveler roller.

Directly following hot leveling, the plate is preferably free air cooled on rigid, level cooling tables such as steel cooling beds to below 600° F. prior to lifting or moving the hot leveled plate. The plate is air cooled until substantially complete transformation of the microstructure has occurred. Preferably, the air cooled plate is not mechanically flattened after the air cooling step. For example, the roller leveled plate can air cool on run out tables at the output of the leveler roller machine. The combination of hot leveling and free air cooling produces material that is naturally flat and free of waviness or wrinkles. In addition the hot leveling and air cooling eliminates the creation of residual bending stresses commonly associated with low temperature leveling and flattening operations typically applied to plate products.

Because the as-hot worked and air cooled steel may be slightly harder than required for the plastic injection mold, the hardness may be adjusted by stress relief heat treatment or tempering For example, a low temperature stress relieving treatment at 450 to 650° F. can improve ductility without changing the as-rolled hardness. Advantageously, such optional tempering does not require high temperatures (such as normalizing and quenching) that otherwise result in the formation of heavy scaling on the metal surfaces. Furthermore, the tempering step also relaxes or removes residual cooling stresses that may remain in the material from the original hot working process. If desired, the steel can be subjected to an aging treatment at 700 to 1025° F. or an overtempering treatment at 1200 to 1300° F. The thermal processing avoids the need for high temperature heating and quenching. The plate in its hot worked state is thus a non-quenched steel which can be provided with a hardness of about 38 to about 42 HRC with or without a stress relief (tempering) heat treatment after hot working (rolling and/or forging).

The steel alloy preferably has uniform hardness entirely across and through the hot worked plate which does not vary by more than 10%, more preferably the hardness does not vary by more than 5%. For example, if a plate of 40 HRC is desired, all portions of the hot worked and tempered plate will have a hardness of 38 to 42 HRC, preferably 39 to 41 HRC. Such uniform hardness avoids hard and soft spots which are detrimental to use of high tool speeds and/or high tool feeds during machining of the plates.

To ensure desired surface quality, the plates are visually inspected and ultrasonically tested to determine internal quality. Provided no surface or internal quality issues are found, plates can be saw cropped to remove top, bottom and side discard. The plates can be processed into mold plates with or without subjecting the plates to an age hardening treatment.

Referring to FIG. 1, shown is an exemplary plastic injection mold 10 having mating mold plates 12 connected to the manifold 16. As can be seen in FIG. 1, each one of the mold plates 12 includes a cavity half 14. When mated, the mold plates 12 form a mold cavity in the shape of a desired article such as a panel or frame of an electronic display such as a flat screen TV. In preparation for molding the plastic article, the mold plates 12 are mated and the manifold 16 is secured to mated ones of the mold plates 12. Sprues 18 and runners 20 formed in the manifold 16 allow molten plastic to be injected into the mold cavity. During the mating of the mold plate 12 and securement of the manifold 16 to mated ones of the mold plates 12 as well as during use of the plastic injection mold 10, it is essential that surfaces 22 do not become warped but remain parallel at all times. Advantageously, the above-described process for producing the mold plate from the steel alloy results in a mold plate that exhibits favorable dimensional stability such that warpage or distortion of the material is minimized, even after heavy material removal.

The chemical composition and method of producing the steel alloy results in a material that is capable of meeting ultrasonic inspection acceptance criteria. Such ultrasonic inspection may be used to detect surface and subsurface flaws in the steel alloy material. Such flaws may include cracks, shrinkage, cavities, flakes, pores, delaminations, and porosity. The steel alloy as described above is substantially capable of meeting ultrasonic inspection acceptance criteria for a 5/64" flat-bottom hole.

In an exemplary processing regime, hot working conditions for the alloy include heating to 1700-2250° F., holding sufficiently long to "soak" through the cross section, and then rolling or forging. Rolling or forging is suspended when material temperature drops to 1700° F.

Plates of the alloy exhibit flatness as-rolled and hot leveled (this hot leveling is an in-line operation at the rolling mill, done within minutes of final reduction pass on the mill). Because the plates can go cold with no danger of cracking, they are left to cool until rigid before lifting (prevents sagging and bending) and exhibit flatness of better than 1/4" across 12 foot spans. The plates show little resistance to leveling at the hot mill leveler and waves and ripples can be removed effectively.

In a test to evaluate machinability, a full sized plate was machined using a standard CNC program and plate size to evaluate upon milling, pocket formation, hole drilling and tapping. The material machined satisfactorily and did not present any problems for standard tooling. In addition, a test block with 115 mm×115 mm cross section was ground, lapped and polished to evaluate material capability to achieve an SP1 A2 finish. The finish achieved was equal to or better than SP1 A2.

Mechanical testing was performed to determine hardness, tensile and impact properties of an exemplary alloy composition. The alloy preferably exhibits a 2% yield strength of at least 115 ksi, a tensile strength of at least 145 ksi, an elongation in two inches of at least 10% and a reduction in area of at least 30%. Results of mechanical testing of a plate having the composition set forth in Table 1 are set forth in Table 5 below.

TABLE 5

| Hardness (HRC) | Tension Test | Tension Test (Longitudinal) | Tension Test (Long Transverse) | Impact Strength Longitudinal (Charpy V-Notch) |
|---|---|---|---|---|
| 39/40 | UTS (Ksi) | 190 | 191 | 10 Ft-Lbs |
| | 2% Yield (Ksi) | 120 | 125 | 9 Ft-Lbs |
| | % Elongation (4D) | 14 | 10 | 9 Ft-Lbs |
| | % Red. Of Area | 32 | 15 | |

Thermal conductivity of the alloy is adequate for its intended applications.

The preferred embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A mold plate for plastic injection having a highly polished mold surface shaped for articles including frames or panels of electronic display screens, the mold plate being formed from a molybdenum-free low carbon martensitic stainless steel alloy comprising in weight %:
   about 0.05 to 0.07% C;
   about 1.15 to 1.45% Mn;
   about 0 to 0.025% P;
   about 0 to 0.008% S;
   about 0.45 to 0.6% Si;
   about 12.15 to 12.65% Cr;
   about 0 to 0.5% Ni;
   about 0.45 to 0.65% Cu;
   about 0.02 to 0.08% V;
   about 0.04 to 0.08% N;
   the balance being Fe with trace amounts of impurities and the alloy has a Rockwell C hardness (HRC) within the range of 38 to 42 HRC.

2. The mold plate of claim 1, wherein the alloy has a 2% yield strength of at least 115 ksi and an ultimate tensile strength of at least 145 ksi.

3. The mold plate of claim 1, wherein the alloy has an elongation in two inches of at least 10% and a reduction in area of at least 30%.

4. The mold plate of claim 1, wherein sulfur is low enough to avoid detectable sulfides by ASTM E45-05, method A and the alloy has at least 0.5% Cu.

5. The mold plate of claim 1, wherein the alloy has no more than 0.05% Cb, no more than 0.05% Ti, no more than 0.20% Co, no more than 0.05% Al, no more than 0.03% Sn, and no more than 0.15% W.

6. The mold plate of claim 1, wherein the alloy comprises a maximum of 10% by volume ferrite phase.

7. The mold plate of claim 1, wherein the alloy comprises in weight % up to 0.010% oxygen.

8. The mold plate of claim 1, wherein the mold surface has a mirror finish.

9. A low carbon martensitic stainless steel alloy in an as-rolled, air-cooled and optionally age hardened condition adapted for use in the manufacture of plastic injection mold plates, the alloy being molybdenum-free and comprising about 1.15%-1.45% by weight Mn, a maximum of 0.025% by weight P, about 0.45%-0.6% by weight Si, about 12.15%-12.65% by weight Cr, a maximum of 0.5% by weight Ni, about 0.45%-0.65% by weight Cu, about 0.02%-0.08% by weight V, about 0.04%-0.08% by weight N, a maximum of 0.008% by weight S, 0.05% to 0.07% by weight C and the balance being Fe with residual impurities wherein the alloy has a Rockwell C hardness (HRC) within the range of 38 to 42 HRC.

10. The alloy of claim 9, wherein the alloy has no more than 0.05% Cb, no more than 0.05% Ti, no more than 0.20% Co, no more than 0.05% Al, no more than 0.03% Sn, and no more than 0.15% W.

11. The alloy of claim 9, wherein the alloy comprises at least 0.5% Cu, a maximum of 10% by volume ferrite phase and sulfur is low enough to avoid detectable sulfides by ASTM E45 -05, method A.

12. A process of manufacturing the mold plate of claim 1, the process comprising the steps of:
casting a molybdenum-free steel alloy comprising about 1.15%-1.45% by weight Mn, a maximum of 0.025% by weight P, about 0.45%-0.6% by weight Si, about 12.15%-12.65% by weight Cr, a maximum of 0.5% by weight Ni, about 0.45%-0.65% by weight Cu, about 0.02%-0.08% by weight V, about 0.04%-0.08% by weight N, a maximum of 0.008% by weight S, about 0.05% to 0.07% by weight C and the balance being Fe with residual impurities, at a temperature not lower than 2800° F.;
hot working the steel alloy within the temperature range of about 1700 -2250° F.;
cooling the steel alloy by free air cooling to room temperature so as to provide a plate having a Rockwell C hardness (HRC) of 38 to 42 HRC;
machining a mold cavity in the plate, the mold cavity configured for plastic injection molding of one or more articles; and
polishing the mold cavity surface to a mirror finish.

13. The process of claim 12, wherein the step of hot working the steel alloy comprises the steps of rolling or forging the steel alloy.

14. The process of claim 13, further comprising hot leveling the steel alloy after finalizing the rolling or forging.

15. The process of claim 12, further comprising age hardening the plate.

16. The process of claim 12, comprising preparing a material charge, melting the material charge in an electric furnace, ladle refining the melted material to remove impurities and homogenize the melted material, removing gases from the melted material by vacuum degassing, argon shield pouring the melted material into a mold and shaping the cast steel alloy in a hot rolling or hot forging mill using an argon shield, hot leveling the steel alloy after rolling or forging, and cooling the steel alloy by free air cooling to a temperature below about 600° F.

17. The process of claim 12, further comprising tempering the plate so as to lower Rockwell C hardness (HRC) at least 2 HRC.

18. The process of claim 12, wherein the steel alloy is formed into a plate having parallel top and bottom surfaces, parallel left and right surfaces and parallel front and back surfaces by milling the tempered air cooled plate and the milled plate is formed into a finished mold plate having pockets, pins and/or alignment holes.

19. A method of forming a plastic injected article using the mold plate of claim 1, the method comprising mating the mold plate with another mold plate to form a mold cavity and injecting molten plastic into the mold cavity.

20. The method of claim 19, wherein front frames of flat screen televisions are ejected from the mold cavity.

21. The mold plate of claim 1, wherein the alloy is in an as-rolled, air-cooled condition having a hardness of 39 to 42 HRC.

22. The alloy of claim 9, having a hardness of 39 to 42 HRC.

* * * * *